United States Patent [19]

Buriks et al.

[11] 3,929,635

[45] Dec. 30, 1975

[54] USE OF POLYMERIC QUATERNARY AMMONIUM BETAINES AS WATER CLARIFIERS

[75] Inventors: Rudolf S. Buriks; Allen R. Fauke, both of St. Louis, Mo.

[73] Assignee: Petrolite Corporation, St. Louis, Mo.

[22] Filed: Mar. 19, 1974

[21] Appl. No.: 452,638

Related U.S. Application Data

[62] Division of Ser. No. 227,261, Feb. 17, 1972, Pat. No. 3,819,589.

[52] U.S. Cl. .................................................. 210/54
[51] Int. Cl.$^2$ ......................................... B01D 21/01
[58] Field of Search ........................ 210/42, 52–57, 210/59; 260/78.5 T

[56] References Cited
UNITED STATES PATENTS

| | | | |
|---|---|---|---|
| 3,374,209 | 3/1968 | Hay et al. | 260/78.4 EP |
| 3,678,098 | 7/1972 | Lewis et al. | 260/89.5 N |
| 3,715,335 | 2/1973 | Bacskai | 210/54 |

*Primary Examiner*—Charles N. Hart
*Assistant Examiner*—Peter A. Hruskoci
*Attorney, Agent, or Firm*—Sidney B. Ring; Hyman F. Glass

[57] ABSTRACT

Polymeric quaternary ammonium betaines; the preparation thereof; and uses therefor. These are illustrated by polymers and copolymers of dicarboxylic anhydrides such as maleic anhydride and copolymers thereof derived from copolymerizable compounds such as olefins, vinyl compounds, etc.; a carboxylic acid group of the anhydride polymeric unit being esterified with a quaternary alkanolamine. The polymers are prepared by reacting the anhydride-containing polymer with an alkylene oxide and a tertiary amine to form quaternary alkanolamine esters.

9 Claims, No Drawings

USE OF POLYMERIC QUATERNARY AMMONIUM BETAINES AS WATER CLARIFIERS

This application is a division of Ser. No. 227,261 filed Feb. 17, 1972 now U.S. Pat. No. 3,819,589.

This invention relates to polymeric quaternary ammonium betaines, the preparation thereof, and uses therefor. These polymeric quaternary ammonium betaines can be prepared from a polymer possessing an anhydride unit. Although the anhydride unit is preferably derived from maleic anhydride, other anhydrides can also be employed, for example citraconic anhydride, etc., can also be employed. These polymers contain a maleic anhydride unit

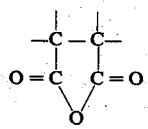

as part of a copolymer.

A wide variety of copolymers of maleic anhydride have been prepared. These can be presented by the idealized formula

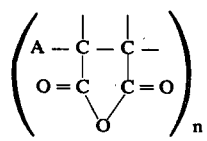

where A is derived from an unsaturated group capable of copolymerizing with maleic anhydride to form a polymer. In most instances the polymer is a 1:1 alternating copolymer. However, in certain instances such as with styrene, etc., 1 or more moles of olefin may react with maleic anhydride. Olefinic compounds capable of copolymerizing with maleic anhydride include the following: vinyl aromatic compounds of the generalized formula

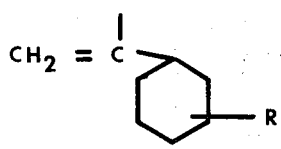

such as styrene, alpha-methylstyrene, chlorostyrene, vinyl toluene, etc.; vinyl esters of the generalized formula

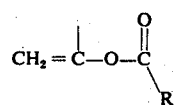

such as vinyl formate, acetate, proprionate, isopropenyl acetate, etc.; vinyl ethers of the generalized formula

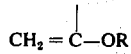

such as vinyl alkyl ethers, for example vinyl methyl ether, vinyl ethyl ether, vinyl propyl ether, etc., vinyl halides of the generalized formula

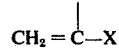

such as vinyl chloride, etc.; hydrocarbon olefins of the generalized formula

such as ethylene, propylene, isobutylene, diisobutylene, higher isobutylenes, etc.; higher olefins such as hexane-1, heptene-1, octene-1, dodecene-1, octadecene-1, etc.

The unsatisfied valences in the above formulae (apart from the polymeric bonds) are hydrogen or a substituted group, preferably hydrocarbon, such as alkyl, etc.

The molecular weight of these polymers can vary widely depending on the particular polymer and use, for example from about a few hundred to about several hundred thousand, such as from about 300 to 300,000 or more, but preferably in the lower range because of their greater solubility and lower viscosity in solution when converted to the betaines, for example, from about 500 to 100,000 with an optimum of about 1,000 to 10,000.

The following equation summarizes the reaction of this invention:

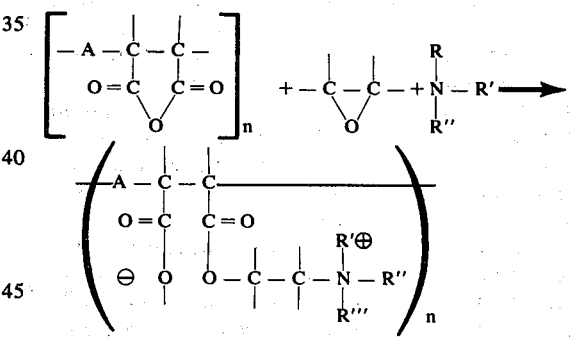

From the above equation, which illustrates the complete reaction of each maleic unit, one mole of alkylene oxide and one mole of tertiary amine are reacted with each maleic anhydride unit of the polymer. Also included within the invention is the reaction of less than one mole of alkylene oxide and one mole of tertiary amine for each maleic unit in which case the resulting polymer would contain unreacted maleic units as represented by the following formula

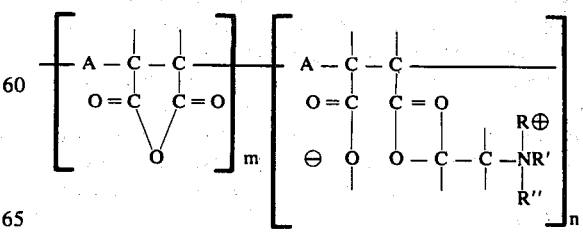

These polymers may be further reacted with other amineepoxide combinations or further reacted with other compounds capable of reacting with anhydride groups such as alcohols, polyols, amines, polyamine, etc., to form derivatives thereof or cross-linked polymers.

An added advantage of the above mentioned new polymeric betaines is the fact that these quaternaries do not contain inorganic anions like $Cl^-$ or $HSO_4^-$ or $SO_4^=$, which are sometimes objectionable when they end up in the crude oil that goes to refineries because of their deleterious effect on the refining catalysts and their potential corrosiveness under certain process conditions.

To obtain the polymers belonging to the novel class of polymeric quaternary ammonium betaines this process involves the reaction of equivalent amount of the anhydride polymer with an equivalent amount or less of the epoxide and the tertiary amine. Due to the nature of the anhydride polymers this reaction should be carried out in a medium that does not react with the anhydride moiety. In other words, solvents like water, or hydroxylic materials like alcohols, glycols, etc., primary or secondary amines, or other such-like materials that will open up the anhydride ring are unsuitable. In general, inert solvents like ketones, such as acetone, methyl-ethyl ketone, etc., aliphatic or aromatic hydrocarbons like hexane or benzene, etc., or more polar solvents like DMF, DMSO, sulfolane, ethers, chloroform, and other halogenated hydrocarbon solvents that do not react with the anhydride units must be used. For similar reasons the solvent used should not react with the other components of the reaction mixture, namely the tertiary amine or the epoxide.

The reaction is carried out by combining the three ingredients in any preferred order in the reaction solvent. The stirred reaction mixture is then kept at a temperature which may range from ambient to the reflux temperature of the solvent until the desired transformation is completed. In many instances the finished product will gradually precipitate or deposit during the course of the reaction. In other instances the product will be completely dissolved at the end of the reaction. This depends primarily upon the choice of the reaction medium and the reaction parameters used. Since the products are polycationic in nature, the materials used in their preparation can be chosen in such a fashion that the resulting products are readily soluble in water or alcohols or mixtures of water and alcohols. If so desired, however, one can also start out with reaction parameters that will yield polymeric quaternaries with complete oil solubility, despite the presence of all of the quaternary ammonium centers and carboxy groups. The reaction may also be carried out with less than the required amount of tertiary amine and epoxide, in which case residual anhydride groups will be present in the product. These may then be opened up in further reactions with other amine-epoxide combinations or used for crosslinking reactions with polyols, primary amines, polyamines, etc. All these variations make this reaction extremely versatile and suitable for a wide variety of modifications without straying too far from its main purpose, namely the preparation of polymeric quaternary ammonium betaines to be used for water clarification.

The term "alkylene oxide," or "oxirane" as used herein means a compound containing the following 1,2-epoxy group

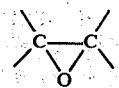

and wherein each unsatisfied epoxy carbon valence of said group is satisfied for example by hydrogen, a hydrocarbon radical, a substituted group, for example an ether-containing group, or other radicals which do not interfere with the polymerization process. In addition, the unsatisfied epoxy carbon valences collectively can represent a divalent aliphatic hydrocarbon radical which together with the epoxy carbon atoms form a ring containing, for example, from 5 to 10 carbon atoms inclusive. It is to be understood, also, that the term "lower alkylene oxides" designates that each unsatisfied epoxy carbon valence of the above-depicted structural unit can be satisfied by hydrogen, a lower alkyl, e.g., methyl, ethyl, propyl, etc., substituted derivatives thereof, and the like.

For example, the monomeric alkylene oxides employed are vicinal-epoxyhydrocarbons which have a single vicinal epoxy group which can be characterized by the following formula:

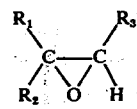

wherein $R_1$, $R_2$ and $R_3$ are hydrogen, a hydrocarbon radical, an aryl radical, an ether-containing radical or other types that do not interfere with the reaction.

Representative alkylene oxides which can be employed are those in which $R_2$ and $R_3$ are hydrogen and $R_1$ is an organic radical such as alkyl, aryl, halogen-containing alkyl or aryl, ether-containing alkyl or aryl, ester-containing alkyl or aryl or mixtures of these types. Specific examples are ethylene oxide (where $R_1$ is also hydrogen), 1,2-pentene oxide, 1,2-hexene oxide, 1,2-octene oxide, 1,2-decene oxide, 1,2-dodecene oxide, propylene oxide, 1,2-butylene oxide, higher 1,2-epoxy alkanes, styrene oxide, o, m, or p-alkyl-styrene oxide, 1,1,1-trifluoro 2-propylene oxide, chlorostyrene oxide, methyl glycidyl ether, ethyl glycidyl ether, isopropyl glycidyl ether, methyl glycidyl ether of propylene glycol, methyl glycidyl ether of dipropylene glycol, methyl glycidyl ether of tripropylene glycol, hexyl glycidyl ether, alpha-chloroethyl glycidyl ether, phenyl glycidyl ether, benzyl glycidyl ether o-, m-, and p-chlorophenyl glycidyl ether, o-, m-, and p-methylphenyl glycidyl ether, glycidyl pivalate, trimethylsilyl glycidyl ether, butyl glycidyl formal, N-(2,3-epoxypropyl)glycidyl ether, etc.

Other representative epoxides which can be employed are those in which $R_3$ is hydrogen and $R_1$ and $R_2$ are organic radicals generally defined as above for $R_1$. Specific examples are, isobutylene oxide, alpha-methyl styrene oxide, 1,1-diphenylethylene oxide, 1,1,1-trifuloro-2-methyl-2-propylene oxide, methylmethacrylate oxide, methylcyclohexene oxide, etc.

Other representative epoxides which can be employed are those in which $R_3$ is hydrogen and $R_1$ and $R_2$ are organic radicals generally defined as above. Specific examples are cis- and trans-2-butene oxide, 1,1,1-trifluoro-2-butene oxide, cyclohexene oxide, etc.

Trisubstituted ethylene oxides can also be employed in which $R_1$, $R_2$ and $R_3$ are all organic radicals as defined above. Trimethyl ethylene oxide is illustrative of this type. Furthermore tetrasubstituted ethylene oxides may be employed such as tetramethyl ethylene oxide.

Any tertiary amine capable of reacting in the desired manner to form the betaine product can be employed. These include aliphatic, arylic, cycloaliphatic, heterocyclic, etc., tertiary amines. Thus the amines have the formula

wherein the R's are aliphatic, arylic, cycloaliphatic, heterocyclic, etc., groups. The R's may be the same or different. The preferred amine is a tri-alkyl amine such as where the alkyl group is methyl, ethyl, propyl, butyl, pentyl, hexyl, heptyl, octyl, nonyl, decyl, undecyl, dodecyl, tridecyl, tetradecyl, petadecyl, hexadecyl, heptadecyl, octodecyl, etc.

All of the alkyl groups may be lower alkyl or may contain a fatty alkyl group (i.e., above 7 carbons) as well as lower alkyl groups, for example

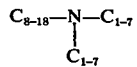

for example

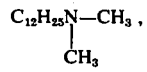

etc.

The R's may also be part of a cyclic structure, for example, pyridine, quinoline, isoquinoline, quinaldine, N-ethyl imidazole, N-alkyl ethylene imine, N-alkyl morpholine, N-alkyl-pyridine, etc.

The following examples are presented for purposes of illustration and not of limitation.

To give just one example of the preparation of such a copolymer, the copolymerization of commercial diisobutylene with maleic anhydride is described below:

EXAMPLE A

Preparation of Maleic-Anhydride-diisobutylene Copolymer

A solution of 49.0 gram (.50 mole) of maleic anhydride and 67.8 gram (.60 mole) of Phillips commercial grade diisobutylene in 150 grams of toluene was sparged with nitrogen and warmed to 80°C. Then two 0.5 gram portions of bis azioisobutyronitrile (Dupont VAZO) were added two hours apart. After a total of 4 hours under nitrogen at 90°C, the toluene was evaporated at reduced pressure leaving 88.0 grams of a brittle white solid polymer. The yield was 83.5% of theory based on maleic anhydride. A molecular weight of 3938 was found by means of vapor phase osmometry in ortho dichlorobenzene.

The following examples illustrate the general procedure for the preparation of polymers belonging to this novel class of polymeric quaternary betaines:

EXAMPLE B

Isobutylene-Maleic Anhydride-Dimethyl Dodecylamine-Ethylene Oxide

A solution of 15.4 grams (.10 mole anhydrides) of an alternating copolymer of isobutylene and maleic anhydride in 61 grams of acetone was treated with 21.3 gram (.10 mole) of dimethyl dodecylamine. The resulting orange solution was charged into a pressure vessel and treated with 4.4 gram (.10 mole) of ethyleneoxide. After 16 hours at 55°, the viscous solution was diluted with methanol. Evaporation of the solvents at reduced pressure left 49.0 grams (95% yield) of a tan solid, which was soluble in water-alcohol mixtures. (NMR indicates the presence of quaternary nitrogen centers. I.R. demonstrates that ester formation took place.)

EXAMPLE C

1-Octene-Maleic Anhydride-Dimethyl Dodecylamine-Ethylene Oxide

A solution of 10.5 grams (0.05 mole anhydride) of an alternating copolymer of 1-octene and maleic anhydride in 70 grams of benzene was treated with 10.7 grams (.05 mole) of dimethyl dodecylamine. The resulting red solution was sealed in a pressure vessel and treated with 2.2 grams (.05 mole) of ethylene oxide. After 16 hours at 55°, the very viscous polymer solution was evaporated leaving 22.2 grams (95% yield) of a brown solid polymer soluble in benzene and alcohols, or mixtures of the two.

EXAMPLE D

Diisobutylene-Maleic Annydride-Trimethyl Amine-Ethylene Oxide

A solution of 16.8 grams (.08 mole anhydride) of an alternating copolymer of diisobutylene and maleic anhydride in 75 grams of benzene was sealed in a pressure vessel and injected with 4.7 grams (.08 mole) of trimethyl amine and 3.5 grams (.08 mole) of ethyleneoxide. After 16 hours at 55°, the product had settled out as a tan solid. Evaporation of the solvent left 23.0 grams (95% yield) of a tan powder, soluble in water-alcohol mixtures.

EXAMPLE E

Diisobutylene-Maleic Anhydride-Trimethyl Amine-Propylene Oxide

A solution of 15.75 grams (.075 mole anhydride) of an alternating copolymer of diisobutylene and maleic anhydride in 75 grams of benzene was sealed in a pressure vessel and injected with 4.43 grams (.075 mole) of trimethyl amine and 4.35 grams (0.075 mole) of propylene oxide. After 16 hours at 55°, the product had settled out as a black solid. Evaporation of the solvent left 22.0 grams (90% yield) of a brittle black solid soluble in water-alcohol mixtures.

EXAMPLE F

Styrene-Maleic Anhydride-Trimethyl Amine-Ethylene Oxide

A solution of 16.2 grams (.08 mole anhydride) of ARCO-SMA 1000a, a 1:1 copolymer of styrene and maleic anhydride MW 1,600, in 75 grams of acetone was sealed in a pressure vessel. Then 4.7 grams (0.08 mole) of trimethyl amine and 3.5 grams (.08 mole) of ethylene oxide were added. After 16 hours at 55°C, the product had settled out as a tan precipitate. The acetone was decanted off and the solid dissolved in methanol. Evaporation of the methanol left 24.4 gram (100%). The polymer was slightly soluble in water and very soluble in water-alcohol mixtures.

EXAMPLE G

Styrene-Maleic Anhydride-Trimethyl Amine-Ethylene Oxide

A solution of 21.0 grams (.07 mole anhydride) of ARCO-SMA 2000a, a 2:1 copolymer of styrene and maleic anhydride MW 1700, in 75 grams of acetone was sealed in a pressure vessel. Then 4.1 grams (.07 mole) of trimethyl amine and 3.1 grams (.07 mole) of ethylene oxide were added. After 16 hours at 55°C, the product had settled out as a tan precipitate. The acetone was decanted off and the solid dissolved in methanol. Evaporation of the methanol left 26.0 grams (92%) of a light tan solid soluble in water-alcohol mixtures.

EXAMPLE H

Ethylene-Maleic Anhydride-Trimethyl Amine-Ethylene Oxide

A solution of 12.6 grams (.10 mole anhydride) of Monsanto EMA-11, a 1:1 ethylene-maleic anhydride copolymer MW 3100, in 75 grams of acetone was sealed in a pressure vessel and treated with 5.9 grams (.10 mole) of trimethyl amine and 4.4 grams (0.10 mole) of ethylene oxide. After 16 hours at 55°C, the product had settled out as a pink precipitate. The acetone was decanted off and the solid dissolved in methanol. Evaporation of the methanol left 22.0 grams, (96% yield) of a brittle pink water soluble polymer.

EXAMPLE I

Ethylene-Maleic Anhydride-Dimethyl Octyl Amine-Ethylene Oxide

A solution of 10.1 grams (.08 mole anhydride) of Monsanto EMA-11, a 1:1 ethylene-maleic anhydride copolymer MW 3100, in 76 grams of acetone was treated with 12.6 grams (.08 mole) of dimethyl octyl amine. The resulting deep red solution was sealed in a pressure vessel and treated with 3.5 grams (.08 mole) of ethylene oxide. After 16 hours at 55°C a pink solid had settled out. The acetone was decanted off and the solid dissolved in methanol. Evaporation of the methanol left 25.4 grams (97% yield) of a brittle pink polymer soluble in water-alcohol mixtures.

WATER CLARIFICATION

The present invention also relates to a method for the clarification of water containing suspended matter.

Accordingly, clarification of water containing suspended particles of matter is effected by adding to such water polymers of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although subsurface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended materials in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The polymer of this invention causes rapid flocculation and also reinforces the formed aggregates of particles causing a general tightening or bonding together of the initial particles and an increased rate of coagulation and settling, thus forming a less turbid supernatant liquid.

The addition of the polymers of this invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the polymer compositions and then to add such solution to the body of water in the proportions indicated above. Clarification may take place either in the natural body of water or it may be caused to take place in hydraulic thickeners of known design.

The amount of polymeric compositions to be employed will vary depending upon the amount and the degree of subdivision of the solids to be agglomerated or flocculated, the chemical nature of such solid and the particular inventive compositions employed. In general, one employs at least a sufficient amount of the polymeric compositions to promote flocculation. In general, one employs 0.005–10,000 ppm or more such as about 0.5–1,000 ppm, for example about 1–500 ppm, but preferably about 2–5 ppm. Since the economics of these processes are important, no more than the minimum amount required for efficient removal is generally employed. It is desired, of course, to employ sufficient polymeric compositions so flocculation will take place without causing the formation of stable dispersions.

The precipitating action of the polymeric compositions can be employed in the application of loading or filling materials to textiles or paper.

In the processing of fine mineral particles in aqueous suspension the polymeric composition flocculating agents will be especially useful. In the processing of ores to separate valuable mineral constituents from undesirable matrix constituents, it is frequent practice to grind the ore into a finely-divided state to facilitate separation steps such as selective flotation and the like. In many ore dressing procedures, the finely-divided ore is suspended in water to form a pulp or slime. After processing, it is usually desirable to dewater the pulps or slimes either by sedimentation or filtering. In such operations, certain ores are particularly troublesome in that the finely-divided ore, when suspended in water, forms a stable slime which settles very slowly, if at all. such slimes are unsuitable for concentration or dewatering by sedimentation and are difficult to dewater by filtration because of the tendency to clog the pores of the filter, thus leading to excessively time-consuming and inefficient operation of the filters. In some cases, for example, in certain phosphate mining operations, the formation of very stable suspension of finely-divided mineral results not only in the loss of considerable valuable mineral as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the polymeric composition of this invention, not intended to be limiting but merely illustrative are listed below. The polymeric composition can be used for the clarification of beers and wines during manufacture. Another use is in processing effluents in pharmaceutical operations for the recovery of valuable products or removal of undesirable by-products. A particularly important use for these polymeric flocculating agents is in the clarification of both beet sugar and cane sugar juices in their processing. Still another use if for flocculation and recovery of pigments from aqueous suspensions thereof. The polymeric composition will be particularly useful in sewage treatment operations as a flocculating agent. A further use is to promote by flocculation the removal of coal from aqueous suspensions thereof. In other words, the polymeric flocculating agents of the invention are generally useful for processing aqueous effluents of all types to facilitate the removal of suspended solids.

A water soluble or water dispersible polymer, to the extent of effective concentration, is employed.

These compositions can also be employed in the process of flocculating white water and/or recycling of the precipitate solids in the paper making process described in U.S. Pat. No. 3,393,157, and other processes described therein.

The manner of practicing the present invention is clear from the foregoing description.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

Examples

A suspension of FeS in brine was subjected to the action of the water-soluble polymers prepared herein.

In these tests, the FeS concentration is 25 parts per million and 1% and 5% brine solution were used. Metered quantities (500 ml.) of the homogeneous suspension were placed into 1,000 ml. beakers and stirred at 100 rpm. The polymer to be tested was injected into the suspension to give final active concentrations varying between 2 through 4 parts per million. A commercial flocculant was run simultaneously at equivalent concentrations for comparison and the stirring was achieved by use of a Phipp and Bird "floc" multi-stirrer. After one minute the stirring rate was reduced to 20 to 30 rpm and maintained thus for ten minutes. At this time the stirring was stopped. The evaluation of the polymer started at the moment of flocculation and continued with respect to the floc size and rate of precipitation. The final evaluation was achieved by visual examination of the color of the resultant aqueous phase.

The results obtained by employing the polymers of this invention are found to be superior to the commercial flocculating agent usually employed.

These polymers are also effective in flocculating the other systems described herein.

The following is a partial list of industry systems in which the polymers of the present invention can be employed as flocculating agents.
1. Petroleum industry
2. Food industry such as in the dairy industry, the canning, freezing and dehydration industries
3. Metal plating industry
4. Chemical and pharmaceutical industries
5. Mining industry, for example, in the phosphate mining industry such as in phosphate slimes
6. Fermentation industries, such as in alcohol, beer, yeast, antibiotics, etc. production
7. Tanning industry
8. Meat packing and slaughter house industry
9. Textile industry
10. Sugar refining industry
11. Coal industry
12. Soap industry
13. Sewage purification
14. Corn starch industry
15. Fat processing and soap industry
16. Paper industry
17. Hydroelectric plants, atomic energy operations, boiler plants, etc.

In addition to their use as water clarifiers the polymers of this invention have the following uses:
1. Primary coagulants
2. Flocculants for solids-liquid separation processes
3. Antistatic agents
4. Soil conditioning
5. Flame retardants
6. Hair sprays, additives to shampoos, soaps, and other cosmetics
7. Sequestering agents and additives to detergents
8. Grease thickening
9. Electroconductive coatings
10. Anion exchange resins
11. Biocides, nematocides, fungicides, etc.
12. Dye mordants and dyeable assists in fibers and photographic film
13. Pigment retention aids and drainage aids in papermaking
14. Wet and dry strength additives in paper
15. Emulsion stabilizers and emulsifiers (also demulsifiers)
16. Corrosion inhibitors
17. Softening agents for fabrics and paper 18. Silver halide peptizers and sensitizers for photographic film
19. Polysalt complexes
20. Permselective membranes
21. Lubricating oil additives
22. Isolation of protein fractions by forming an insoluble complex and regenerating the protein
23. Functional coatings for adhesion, curing, etc.
24. Printing inks
25. Adhesives

BREAKING EMULSIONS OF THE OIL-IN-WATER CLASS

This phase of the present invention relates to a process for resolving or separating emulsions of the oil-in-water class, by subjecting the emulsion to the action of the compositions of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing copolymer butadiene-styrene or GR-S synthetic rubber; oil-in-water emulsions occurring in the cooling water systems of gasoline absorption plants; pipe press emulsions from steam-actuated presses in clay pipe manufacture; emulsions or petroleum residues-in-diethylene glycol, in the dehydration of natural gas.

In other industries and arts, emulsions of oily materials in water or other non-oily media are encountered, for example, in synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of these emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

Some emulsions are by-products of manufacturing procedures, in which the composition of the emulsion and its ingredients is known. In many instances, however, the emulsions to be resolved are either naturally-occurring or accidentally or unintentionally produced; or in any event they do not result from a deliberate or premeditated emulsification procedure. In numerous instances, the emulsifying agent is unknown; and as a matter of fact an emulsifying agent in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention comprises subjecting an emulsion of the oil-in-water class to the action of a reagent or demulsifier of the kind herein described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation and settling time are somewhat inter-related. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent as used in a companion test in which no agitation was used. Such companion test separated a clear aqueous layer only after standing quiescent for hours. Natural gas was found to be as good a gaseous medium as was air in this operation.

It should be distinctly understood that such aeration technique, while an important adjunct to the use of the present reagent, in some cases, is not an equivalent procedure. This may be proved by subjecting an unchemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will obviously be desirable to use some other gas which is inert under the conditions of use.

Although heat is ordinarily of little importance in resolving oil-in-water class emulsions with my reagents, there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

The reagents may be employed alone, or they may in some instances be employed to advantage admixed with other compatible oil-in-water demulsifiers.

The process is commonly practiced simply by introducing small proportions of the reagent into an oil-in-water class emulsion, agitating to secure distribution of the reagent and incipient coalescence, and letting the mixture stand until the oil phase separates. The proportion of reagent required will vary with the character of the emulsion to be resolved. Ordinarily, proportions of reagent required are from about 1 ppm to about 500 ppm the volume of emulsion treated, but more or less may be required in specific instances. Preferably from about 10 ppm to 100 ppm is employed.

A preferred method of practicing the process to resolve a petroleum oil-in-water emulsion is as follows: Flow the oil well fluids, consisting of free oil, oil-in-water emulsion, and natural gas, through a conventional gas separator, then to a conventional steel oilfield tank, of, for example, 5,000-bbl. capacity. In this tank the oil-in-water emulsion falls to the bottom, is withdrawn, and is so separated from the free oil. The oil-in-water emulsion, so withdrawn, is subjected to the action of the reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface and is removed. The separated water, containing relatively little to substantially none of the previously emulsified oil, is thereafter discarded.

FIELD EXAMPLES

The compositions of this invention were very effective in the resolution of oil-in-water emulsions.

A. In a California oil lease compounds of Examples D and E converted o/w petroleum emulsions to clear water in concentrations of 6-8 ppm.

B. In Alberta, Canada, compound G converted o/w petroleum emulsions to clear water at 1 ppm.

C. In a Wyoming oil field, the compounds of Example H converted an o/w petroleum emulsion to clear water at 25 ppm.

We claim:

1. The process of water clarification which comprises treating an aqueous system with an effective amount of a polymeric quaternary ammonium betaine which has no anions and is a polymer derived from a dicarboxylic acid anhydride.

2. The process of claim 1 where the polymeric quaternary ammonium betaine which has no anions has the repeating unit

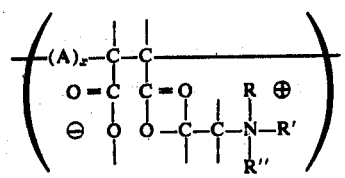

or the repeating unit

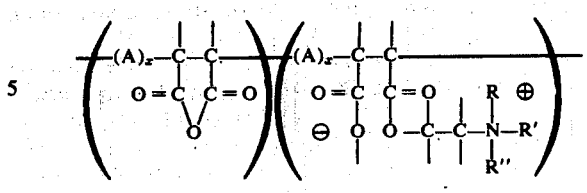

where A is derived from an unsaturated group capable of copolymerizing with the dicarboxylic anhydride to form a polymer, R, R' and R'' are aliphatic, arylic, cycloaliphatic or heterocyclic groups and are the same or different, and x is 1 or more, said unsatisfied valences in said formulae being hydrogen, hydrocarbon or substituted group.

3. The process of claim 2 where the polymeric quaternary ammonium betaine

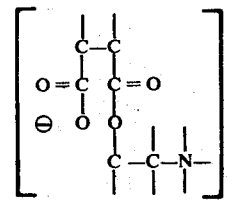

which has no anions is styrene-maleic anhydride-trimethyl amine-ethylene oxide.

4. The process of claim 2 where the polymeric quaternary ammonium betaine

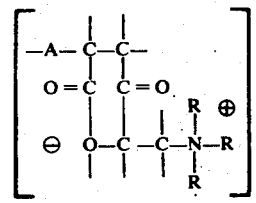

which has no anions is diisobutylene-maleic anhydride-trimethyl-amine-ethylene oxide.

5. The process of claim 2 where the polymeric quaternary ammonium betaine which has no anions is diisobutylene-maleic anhydride-trimethyl amine-propylene oxide.

6. The process of claim 2 where the polymeric quaternary ammonium betaine which has no anions is ethylene-maleic anhydridetrimethyl amine-ethylene oxide.

7. A process of water clarification which comprises dispersing throughout an aqueous system containing suspended particles an effective amount of a polymeric quaternary ammonium betaine which has no anions and which has the repeating unit

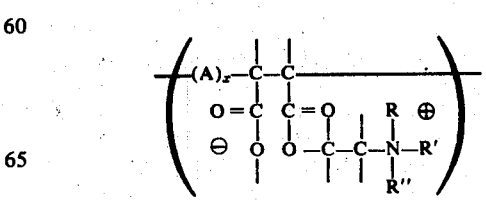

or the repeating unit

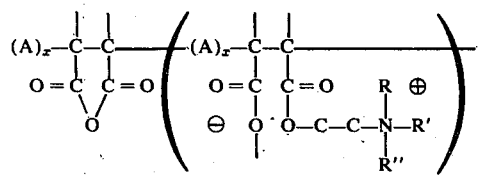

where A is derived from an unsaturated group capable of copolymerizing with the dicarboxylic anhydride to form a polymer, R, R' and R'' are aliphatic, arylic, cycloaliphatic or heterocyclic groups and are the same or different, and $x$ is 1 or more, said unsatisfied valences in said formulae being hydrogen, hydrocarbon or substituted group.

8. The process of claim 7 where the polymeric quaternary ammonium betaine which has no anions is styrene-maleic anhydride-trimethyl amine-ethylene oxide.

9. The process of claim 7 where the polymeric quaternary ammonium betaine which has no anions is diisobutylene-maleic anhydride-trimethyl amine-ethylene oxide.

* * * * *